US011080779B1

(12) United States Patent
Smoot et al.

(10) Patent No.: US 11,080,779 B1
(45) Date of Patent: Aug. 3, 2021

(54) SYSTEMS AND METHODS OF PRESENTING A MULTI-MEDIA ENTERTAINMENT IN A VENUE

(71) Applicant: Disney Enterprises, Inc., Burbank, CA (US)

(72) Inventors: Lanny S. Smoot, Thousand Oaks, CA (US); Scott F. Watson, Marina Del Rey, CA (US); Nitzan Katz, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 17/231,562

(22) Filed: Apr. 15, 2021

Related U.S. Application Data

(63) Continuation of application No. 15/620,442, filed on Jun. 12, 2017, now Pat. No. 10,997,649.

(51) Int. Cl.
*G06Q 30/06* (2012.01)
*G06Q 10/06* (2012.01)

(52) U.S. Cl.
CPC ....... *G06Q 30/0641* (2013.01); *G06Q 10/067* (2013.01)

(58) Field of Classification Search
CPC ................... G06Q 30/0641; G06Q 10/067
See application file for complete search history.

(56) References Cited

U.S. PATENT DOCUMENTS

| 8,649,554 | B2* | 2/2014 | Markovic | G06T 3/40 |
| | | | | 382/103 |
| 9,477,302 | B2* | 10/2016 | Kauffmann | G06F 3/011 |
| 10,431,006 | B2* | 10/2019 | Mahler | G06F 3/016 |
| 2008/0206732 | A1* | 8/2008 | Zalewski | G09B 5/06 |
| | | | | 434/323 |
| 2010/0082727 | A1* | 4/2010 | Zalewski | G09B 5/06 |
| | | | | 709/201 |
| 2010/0083307 | A1* | 4/2010 | Zalewski | G09B 5/06 |
| | | | | 725/34 |
| 2011/0117532 | A1* | 5/2011 | Relyea | G01J 3/2823 |
| | | | | 434/307 R |
| 2011/0228962 | A1* | 9/2011 | Taylor | G10H 1/0008 |
| | | | | 381/322 |

(Continued)

*Primary Examiner* — Florian M Zeender
*Assistant Examiner* — Whitney Poffenbarger
(74) *Attorney, Agent, or Firm* — Farjami & Farjami LLP (57) ABSTRACT

According to one implementation, an interactive retail venue includes a computing platform interactively linked to a display screen, a lighting system, an audio system, a dynamic product display unit, and multiple product sensors. The computing platform includes a hardware processor and a memory storing a venue orchestration software code. The hardware processor executes the venue orchestration software code to receive sensor data from the product sensors, determine respective locations of retail products within the interactive retail venue based on the sensor data, and present a multi-media entertainment featuring the retail products using the display screen, the lighting system, and the audio system. The hardware processor further executes the venue orchestration software code to concurrently activate the dynamic product display unit if at least one of the retail products is situated within a predetermined distance of the dynamic product display unit.

12 Claims, 5 Drawing Sheets

(56) References Cited

U.S. PATENT DOCUMENTS

| | | | | |
|---|---|---|---|---|
| 2011/0234838 | A1* | 9/2011 | Naganuma | G06T 13/80 |
| | | | | 348/222.1 |
| 2013/0083215 | A1* | 4/2013 | Wisniewski | H04N 5/2621 |
| | | | | 348/222.1 |
| 2014/0055352 | A1* | 2/2014 | Davis | G06F 3/017 |
| | | | | 345/156 |
| 2014/0306995 | A1* | 10/2014 | Raheman | G06T 19/006 |
| | | | | 345/633 |
| 2015/0048933 | A1* | 2/2015 | Danieau | A63F 13/28 |
| | | | | 340/407.1 |
| 2015/0220777 | A1* | 8/2015 | Kauffmann | H04N 5/2621 |
| | | | | 382/103 |
| 2016/0085303 | A1* | 3/2016 | Israr | G06F 3/016 |
| | | | | 340/407.2 |
| 2016/0133230 | A1* | 5/2016 | Daniels | G06T 19/006 |
| | | | | 345/633 |
| 2017/0078566 | A1* | 3/2017 | Ota | H04N 5/23229 |
| 2017/0150068 | A1* | 5/2017 | David | G07F 17/16 |

* cited by examiner

SYSTEMS AND METHODS OF PRESENTING A MULTI-MEDIA ENTERTAINMENT IN A VENUE

The present application is a Continuation of U.S. application Ser. No. 15/620,442, filed Jun. 12, 2017, which is hereby incorporated by reference in its entirety into the present application.

BACKGROUND

The convenience and efficiency of e-commerce has had a devastating impact on traditional brick-and-mortar retail outlets, and has even come to threaten their viability as a business model. Perhaps no effort on the part of traditional retailers can enable an in-store shopping experience to compete with an online product search and purchase on the grounds of speed or ease. Even the maintenance of an extensive inventory of goods and the presence of a well trained and attentive sales staff may be inadequate to overcome the inconvenience associated with traveling to and from a brick-and-mortar retail outlet to complete a purchase.

If traditional retail outlets are in fact to survive and prosper, they must offer customers a shopping experience including features that cannot be readily replicated in an online environment. Thus, there is a need for a commercial solution enabling a brick-and-mortar retail venue to provide an interactive experience sufficiently attractive to motivate potential shoppers to do their browsing and purchasing in-store.

SUMMARY

There are provided interactive retail venues, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As described above, the convenience and efficiency of e-commerce has had a devastating impact on traditional brick-and-mortar retail outlets. For example, it seems that no effort on the part of traditional retailers can enable an in-store shopping experience to compete with an online product search and purchase on the grounds of speed or ease. Consequently, even the maintenance of an extensive inventory of goods and the presence of a well trained and attentive sales staff may be inadequate to overcome the inconvenience associated with traveling to and from a brick-and-mortar retail outlet to complete a purchase.

However, and as further described above, if traditional retail outlets are in fact to survive and prosper, they must offer customers a shopping experience including features that cannot be readily replicated in an online environment. By creating a retail venue providing an immersive and interactive customer experience that blends shopping with entertainment, the present application discloses such a commercial solution. As a result, the present application advantageously discloses a brick-and-mortar retail venue designed to provide an interactive customer experience sufficiently attractive to motivate potential shoppers to do their browsing and purchasing in-store.

Figure 1:
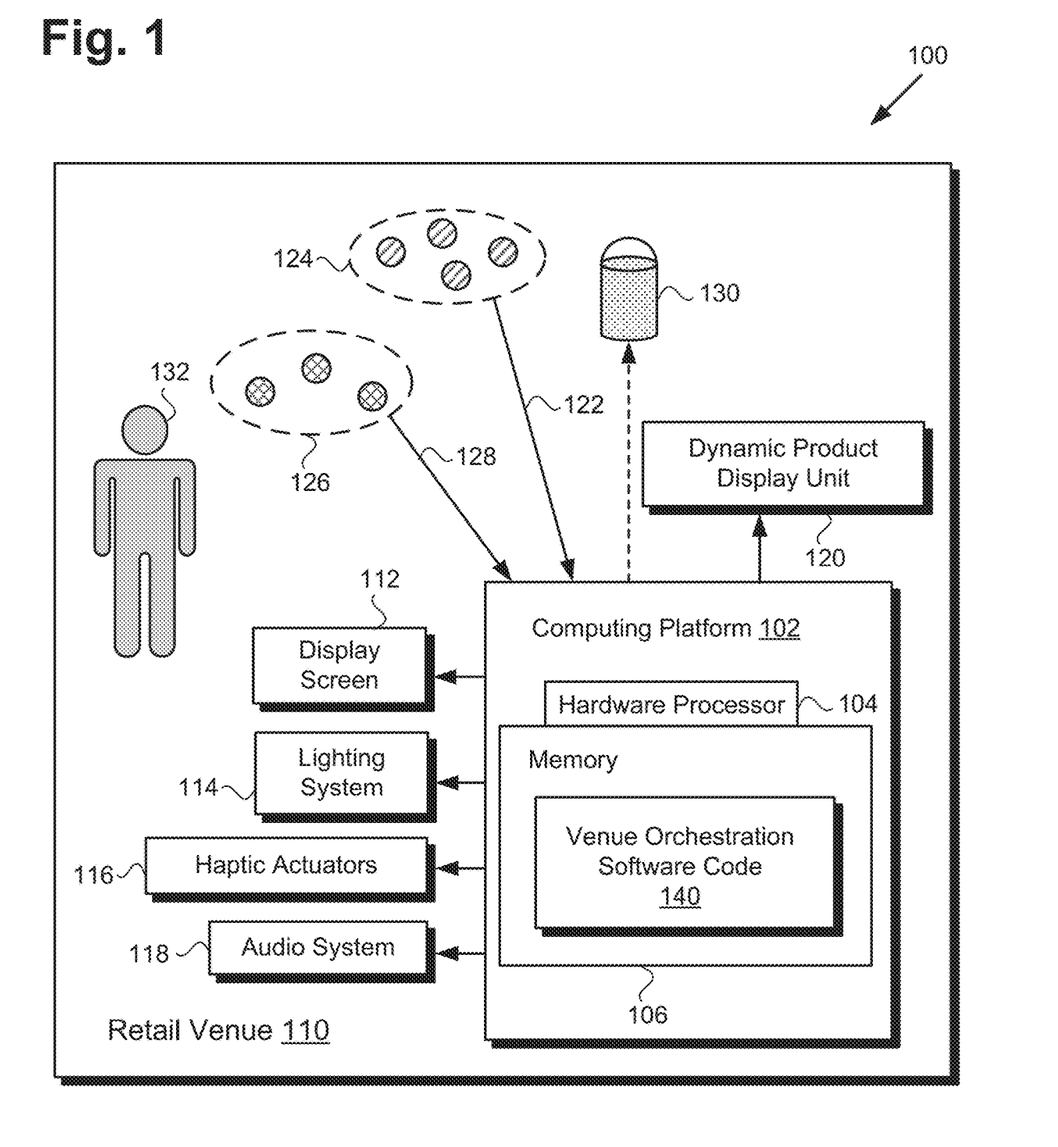
FIG. 1 shows a diagram of an interactive retail venue, according to one implementation.

FIG. 1 shows diagram 100 of interactive retail venue 110, according to one implementation. As shown in FIG. 1, retail venue 110 includes computing platform 102 interactively linked to display screen 112, lighting system 114, audio system 118, dynamic product display unit 120, and product sensors 124 of retail venue 110. As further shown in FIG. 1, computing platform 102 has hardware processor 104, and memory 106 storing venue orchestration software code 140. Also shown in FIG. 1 are haptic actuators 116 interactively linked to computing platform 102, haptic sensors 126, motorized retail product 130 in wireless communication with computing platform 102, and customer 132 of retail venue 110. In addition, FIG. 1 shows product sensor data 122 generated by product sensors 124, and haptic sensor data 128 generated by haptic sensors 126.

Figure 2:
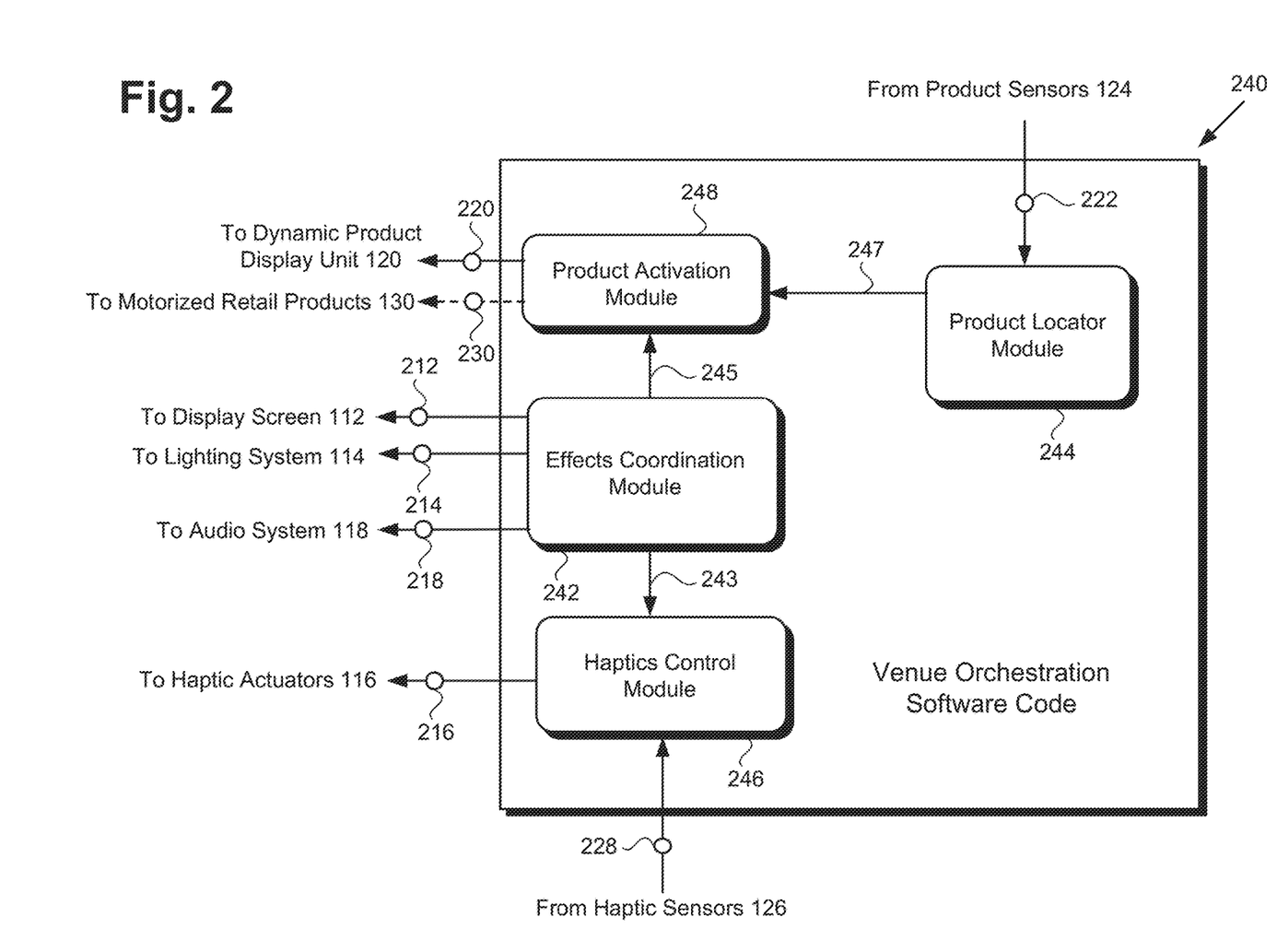
FIG. 2 shows a diagram of an exemplary venue orchestration software code suitable for use by an interactive retail venue, according to one implementation.

FIG. 2 shows a more detailed diagram of exemplary venue orchestration software code 240 suitable for use by computing platform 102 of retail venue 110, in FIG. 1, according to one exemplary implementation. As shown in FIG. 2, venue orchestration software code 240 may receive product sensor data 222 and/or haptic sensor data 228 from respective product sensors 124 and haptic sensors 126, in FIG. 1, as inputs. As further shown in FIG. 2, venue orchestration software code 240 may provide display signal 212 as an output to display screen 112, lighting signal 214 as an output to lighting system 114, and audio signal 218 as an output to audio system 118.

In addition, venue orchestration software code 240 may provide display activation signal 220 as an output to dynamic product display unit 120 and/or product activation signal 230 to motorized retail product 130, based at least in part on product sensor data 222. Moreover, venue orchestration software code 240 may provide haptic activation signal 216 as an output to one or more of haptic actuators 116, based at least in part on haptic sensor data 228.

As shown in FIG. 2, according to the present exemplary implementation, venue orchestration software code 240 includes effects coordination module 242, product locator module 244, haptics control module 246, and product activation module 248. Also shown in FIG. 2 are haptic effects data 243 and product effects data 245 generated by effects coordination module 242, and product location data 247 provided by product locator module 244.

Product sensor data 222, haptic sensor data 228, and venue orchestration software code 240 correspond respectively in general to product sensor data 122, haptic sensor data 128, and venue orchestration software code 140, in FIG. 1, and those corresponding features may share any of the characteristics attributed to either corresponding feature by the present disclosure. Thus, although not explicitly shown in FIG. 1, like venue orchestration software code 240, in FIG. 2, venue orchestration software code 140 includes features corresponding respectively to effects coordination module 242, product locator module 244, haptics control module 246, and product activation module 248.

Figure 3:
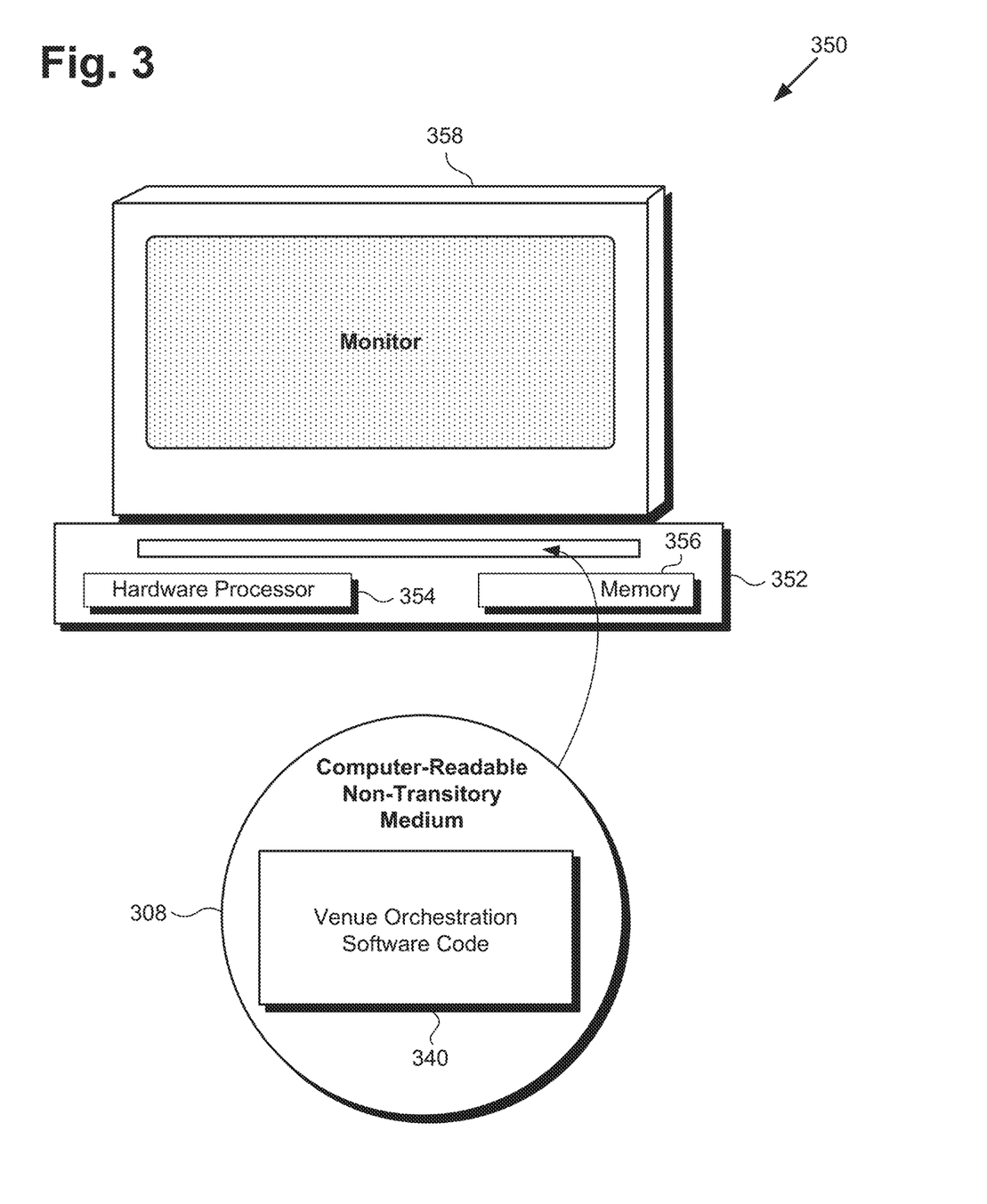
FIG. 3 shows an exemplary system and a computer-readable non-transitory medium including instructions enabling execution of a method for use by an interactive retail venue, according to one implementation.

FIG. 3 shows exemplary system 350 and computer-readable non-transitory medium 308 including instructions enabling execution of a method for use by an interactive retail venue, such as retail venue 110, in FIG. 1, according to one implementation. System 350 includes computing platform 352 having hardware processor 354 and memory 356, interactively linked to computer monitor 358. Computing platform 352 having hardware processor 354 and memory 356, corresponds in general to computing platform 102 having hardware processor 104 and memory 106, in FIG. 1.

Also shown in FIG. 3 is computer-readable non-transitory medium 308 having venue orchestration software code 340 stored thereon. The expression "computer-readable non-transitory medium," as used in the present application, refers to any medium, excluding a carrier wave or other transitory signal, that provides instructions to hardware processor 354 of computer platform 352. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

According to the implementation shown in FIG. 3, computer-readable non-transitory medium 308 provides venue orchestration software code 340 for execution by hardware processor 354 of computing platform 352. Venue orchestration software code 340 corresponds in general to venue orchestration software code 140/240, in FIGS. 1/2, and is capable of performing all of the operations attributed to those corresponding features by the present disclosure. In other words, in implementations in which hardware processor 354 of computing platform 352 accesses computer-readable non-transitory medium 308 and executes venue orchestration software code 140/240/340, computing platform 352 may perform any of the actions attributed to computing platform 102 of retail venue 110 by the present disclosure.

Figure 4:
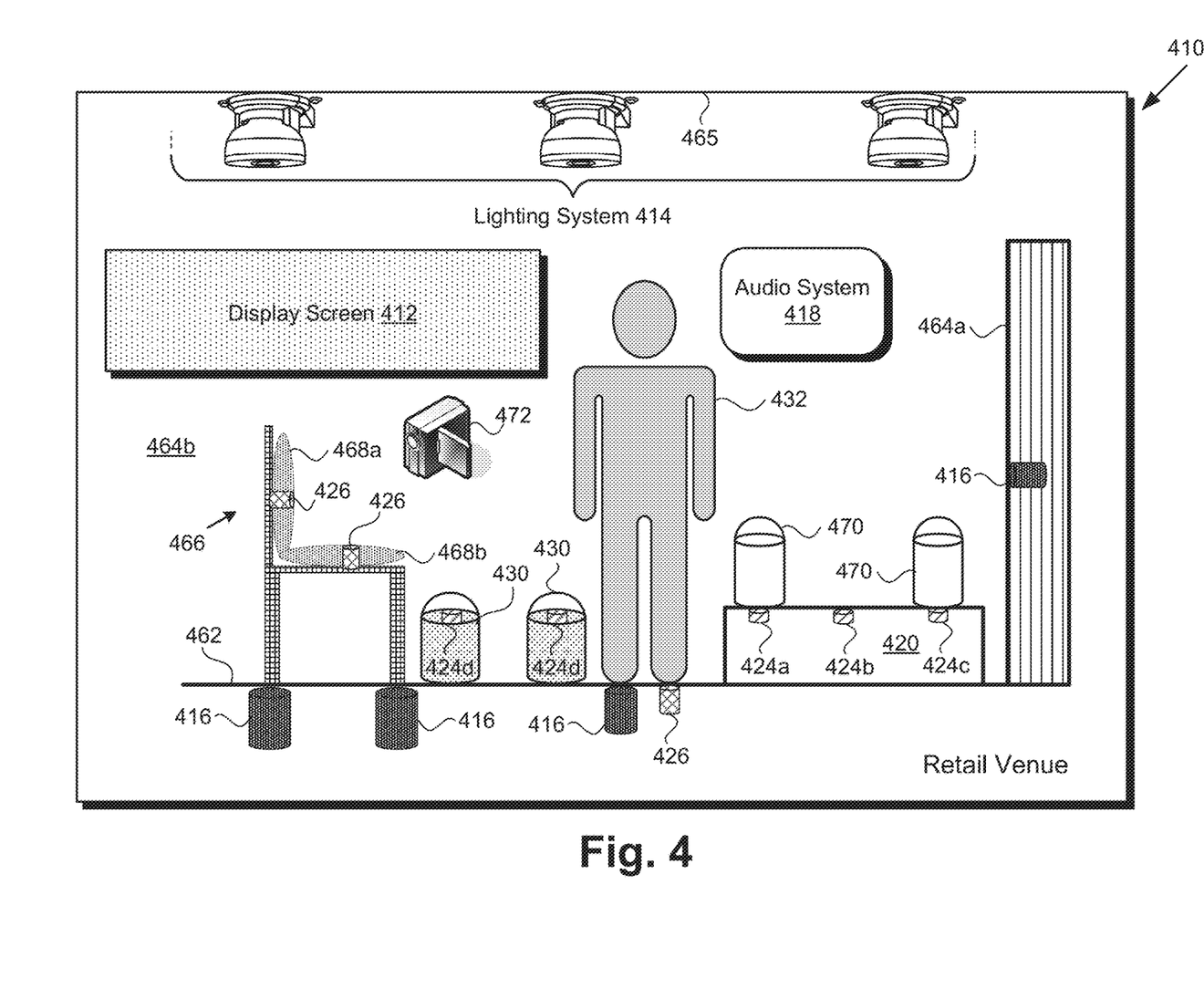
FIG. 4 shows an exemplary interactive retail venue, according to one implementation.

FIG. 4 shows exemplary interactive retail venue 410, according to one implementation. As shown in FIG. 4, retail venue 410, which may be a brick-and-mortar store, for example, includes floor 462, exemplary walls 464a and 464b, and ceiling 465. In addition, retail venue 410 includes display screen 412, lighting system 414, audio system 418, dynamic product display unit 420, and product sensors 424a, 424b, 424c (hereinafter "product sensors 424a-424c"). Also shown in FIG. 4 are motorized retail products 430, each including optional product sensor 424d, retail products 470, which may be non-motorized retail products, video camera 472, and customer 432 of retail venue 410 corresponding to customer 132 of retail venue 110, in FIG. 1.

As further shown in FIG. 4, retail venue 410 includes haptic sensors 426, and haptic actuators 416 in a variety of implementational settings. Moreover, and as also shown in FIG. 4, retail venue 410 includes seating structure 466, which may be a chair or bench, for example, having seating surfaces 468a and 468b. It is noted that although FIG. 4 shows seating structure 466 as a single structure, that representation is merely provided in the interests of conceptual clarity. In other implementations, retail venue 410 may include multiple seating structures corresponding to seating structure 466. That is to say, retail venue 410 may include one or more benches and/or one or more chairs for the use, comfort, and entertainment of customer 132/432.

According to the exemplary implementation shown in FIG. 4, haptic sensors 426 may be situated in various locations in retail venue 410. For example, haptic sensors 426 may be embedded in or under floor 462 to sense the location of customer 132/432 on floor 462. Alternatively, or in addition, haptic sensors 426 may be implemented in seating surfaces 468a and/or 468b to detect use of seating structure 466 by customer 132/432.

Haptic actuators 416 may have differing sizes and may be implemented so as to have differing orientations. For example, one or more of haptic actuators 416 may be implemented in wall 464a and/or 464b. Alternatively, or in addition, one or more larger haptic actuators 416 may be embedded in or under floor 462. For example, haptic actuators 416 embedded in or under floor 462 of retail venue 410 can be utilized to produce haptic effects experienced by customer 132/432 as customer 132/432 stands on floor 462. In addition, or alternatively, haptic actuators 416 embedded in or under floor 462 of retail venue 410 can be utilized produce haptic effects experienced by customer 132/432 while customer 132/432 is seated on seating structure 466.

In some implementations, as shown in FIG. 4, haptic actuators 416 may be oriented such that the haptic effects they produce are applied substantially perpendicular to the surfaces or objects in which they are situated. Thus, haptic actuators 416 may produce effects that are perceived by customer 432 of retail venue 410 to be produced by seating structure 466, walls 464a and/or 464b, and/or floor 462.

Retail venue 410 corresponds in general to retail venue 110, in FIG. 1, and those corresponding features may share any of the characteristics attributed to either corresponding feature by the present disclosure. That is to say, although not explicitly shown in FIG. 4, like retail venue 110, in FIG. 1, retail venue 410 includes a computing platform corresponding to computing platform 102/352 having hardware processor 104/354, and memory 106/356 storing venue orchestration software code 140/240/340. Moreover, like computing platform 102, the computing platform of retail venue 410 is interactively linked to display screen 412, lighting system 414, audio system 418, dynamic product display unit 420, product sensors 424a-424c and 424d, haptic actuators 416, and haptic sensors 426.

In addition, display screen 412, lighting system 414, audio system 418, dynamic product display unit 420, and product sensors 424a-424c and 424d correspond respectively in general to display screen 112, lighting system 114, audio system 118, dynamic product display unit 120, and product sensors 124 in FIG. 1, and those corresponding features may share any of the characteristics attributed to either corresponding feature by the present disclosure. Moreover, haptic actuators 416, haptic sensors 426, and motorized retail products 430 correspond respectively to haptic actuators 116, haptic sensors 126, and motorized retail product 130, in FIG. 1. Thus, like motorized retail product 130, motorized retail products 430 may be in wireless communication with computing platform 102/352.

Figure 5:
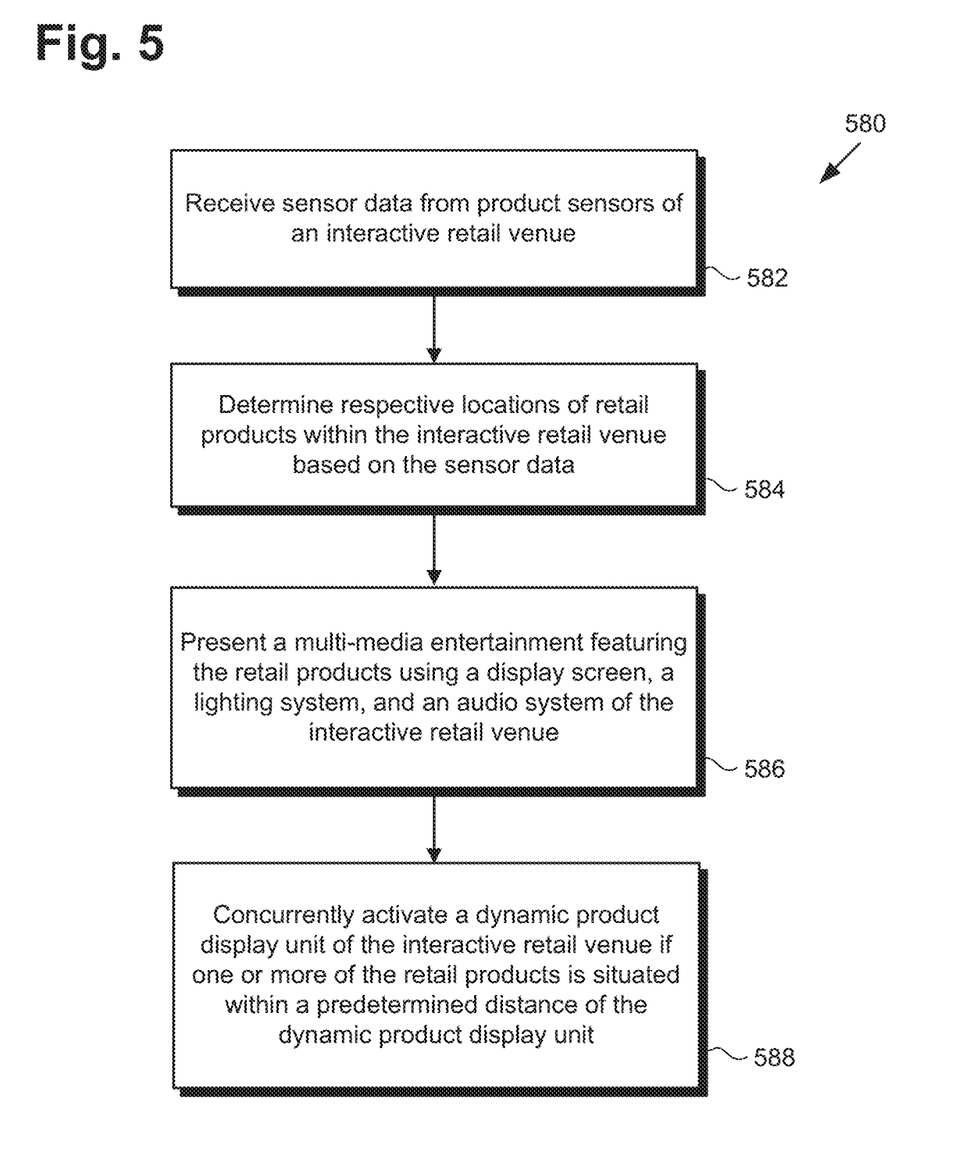
FIG. 5 shows a flowchart presenting an exemplary method for use by an interactive retail venue, according to one implementation.

The functionality of interactive retail venue 110/410 will be further described by reference to FIG. 5 in combination with FIGS. 1, 2, 3, and 4. FIG. 5 shows flowchart 580 presenting an exemplary method for use by interactive retail venue 110/410, according to one implementation. With respect to the method outlined in FIG. 5, it is noted that certain details and features have been left out of flowchart 580 in order not to obscure the discussion of the inventive features in the present application.

Referring to FIG. 5 in combination with FIGS. 1, 2, 3, and 4, flowchart 580 begins with receiving sensor data 122/222 from product sensors 124/424a-424c/424d of interactive retail venue 110/410 (action 582). Product sensors 124/424a-424c may be situated in various locations within retail venue 110/410 at which retail products 470 are placed for display to customer 132/432. In some implementations, motorized retail products 130/430 may be optionally equipped with product sensors 424d that move with motorized retail products 130/430 when and if motorized products 130/430 are activate as to move within retail venue 110/410.

Product sensors 424d are wireless sensors wirelessly coupled to computing platform 102/352, while product sensors 124/424a-424c may be wirelessly coupled to computing platform 102/352 or may be coupled to computing platform 102/352 via one or more wired connections. Sensor data 122/222 may be received from product sensors 124/424a-424c/424d by venue orchestration software code 140/240/340, executed by hardware processor 104/354 of computing platform 102/352.

Flowchart 580 continues with determining the respective locations of retail products 470 and/or motorized retail products 130/430 within retail venue 110/410 based on sensor data 122/222 (action 584). Referring to FIG. 4, according to the exemplary implementation shown in that figure, retail products 470 are situated on dynamic product display unit 120/420 for display to customer 132/432. Moreover, according to the exemplary implementation shown in FIG. 4, dynamic product display unit 120/420 is designed to hold three of retail products 470 at locations corresponding respectively to each of product sensors 424a-424c. As a result, when dynamic product display unit 120/420 is fully stocked with retail products 470, a respective one of retail products 470 is situated over each of product sensors 424a-424c.

However, due for example to sales of retail products 470, or to displacement of one or more of retail products 470 from dynamic product display unit 120/420, one or more of the locations for display of retail products 470 provided by dynamic product display unit 120/420 may be temporarily unoccupied. Furthermore, the occupancy of dynamic product display unit 120/420 by retail products 470 may be highly variable over the course of a normal retail sales business day. For example, and as shown by FIG. 4, during some time interval, one of retail products 470 is situated over each of product sensors 424a and 424c, but retail product 470 normally situated over product sensor 424b is absent.

It is noted that although the implementation shown in FIG. 4 depicts single dynamic product display unit 120/420 designed to display three of retail products 470, that simplified representation is provided merely for conceptual clarity. More generally, retail venue 110/410 includes many product display units, several of which may correspond to dynamic product display unit 120/420. Moreover, each of dynamic product display units 120/420, which may be platforms or shelved display units, for example, may be designed to store more, such as many more than three of retail products 470.

In implementations in which retail venue 110/410 includes motorized retail products 130/430 optionally equipped with product sensors 424d, sensor data 122/222 may be used to track the movements of motorized retail products 130/430 within retail venue 110/410. Determination of the respective locations of retail products 470 and/or motorized retail products 130/430 within retail venue 110/410 may be performed by venue orchestration software code 140/240/340, executed by hardware processor 104/354 of computing platform 102/352, and using product locator module 244.

Thus, in the exemplary implementation shown in FIG. 4, venue orchestration software code 140/240/340, executed by hardware processor 104/354 and using product locator module 244 determines that retail products 470 are located over product sensors 424a and 424c, but that no retail product 470 is located over product sensor 424b. In addition, venue orchestration software code 140/240/340, executed by hardware processor 104/354 and using product locator module 244 may determine that motorized retail products 130/430 are located adjacent seating structure 466. Flowchart 580 continues with presenting a multi-media entertainment featuring retail products 470 and/or motorized retail products 130/430 using display screen 112/412, lighting system 114/414, and audio system 118/418 (action 586). Display screen 112/412 may be a large, wall mounted or wall inset display screen, for example. In some implementations, for instance, display screen 112/412 may occupy substantially all of wall 464b of retail venue 110/410. Display screen 112/412 may take the form of a liquid crystal display (LCD), a light-emitting diode (LED) display, an organic light-emitting diode (OLED) display, or another suitable display screen that performs a physical transformation of signals to light.

Lighting system 114/414 may be mounted on or adjacent to ceiling 465 of retail venue 110/410, may include multiple light sources, and may be configured to provide light of varying intensity and varying colors, for example. For instance, lighting system 114/414 may include small spotlights configured to provide directional lighting that can be turned on or off, or be selectively dimmed and brightened to emphasize one or more of retail products 470 and/or motorized retail products 130/430.

Audio system 118/418 may be a venue wide audio system, such as a theater quality Dolby® high definition (HD) surround-sound system, for example. Moreover, audio system 118/418 may include a library of stored audio recordings that can be played back through audio speakers near one or more retail products 470 and/or motorized retail products 130/430 in order to emphasize those products.

In some implementations, lighting system 114/414 and audio system 118/418 may be synchronized with display screen 112/412 to produce an immersive multi-media environment within retail venue 110/410. The multi-media entertainment featuring retail products 470 and/or motorized retail products 130/430 may take place for a predetermined period of time, such as approximately five minutes, for example, and may be repeated at intervals during the day.

In implementations in which retail products 470 and/or motorized retail products 130/430 are movie themed retail products, for example, the multi-media entertainment provided using display screen 112/412, lighting system 114/414, and audio system 118/418 may relate to the movie corresponding to retail products 470 and/or motorized retail products 130/430. For instance, the multi-media entertainment may include showing images from the corresponding movie on display screen 112/412, and/or substantially reproducing, or at least simulating, visual effects from the corresponding movie using lighting system 114/414, and/or playing a portion or portions of the movie soundtrack using audio system 118/418.

The multi-media entertainment featuring retail products 470 and/or motorized retail products 130/430 may be presented by venue orchestration software code 140/240/340, executed by hardware processor 104/354 of computing platform 102/352, and using effects coordination module 242, in combination with display screen 112/412, lighting system 114/414, and audio system 118/418. That is to say, venue orchestration software code 140/240/340 may utilize effects coordination module 242 to provide display signal 212, lighting signal 214, and audio signal 218 as respective outputs to display screen 112/412, lighting system 114/414, and audio system 118/418 for producing the multi-media entertainment.

In some implementations, Flowchart 580 can conclude with concurrently activating dynamic product display unit 120/420 if one or more of retail products 470 and/or motorized retail products 130/430 is situated within a predetermined distance of dynamic product display unit 120/420 (action 588). Dynamic product display unit 120/420 may be designed to move when activated by venue orchestration software code 140/240/340, executed by hardware processor 104/354 of computing platform 102/352. For example, dynamic product display unit 120/420 may include a display platform configured to move up and down, and/or forward and backward, and/or to tilt and/or turn, as well as to execute complex combinations of those movements. Alternatively, or in addition, dynamic product display unit 120/420 may be equipped with lights, such as flashing lights, and/or speakers or other audio output devices.

Activating dynamic product display unit 120/420 may include causing dynamic product display unit 120/420 to be raised, lowered, extended forward or backward, tilted, turned, and/or spun, and/or to emit light and/or sound for attracting attention to retail products 470 and/or motorized retail products 130/430 concurrently with presentation of the multi-media entertainment in action 586, described above. Activation of dynamic product display unit 120/420 may be performed by venue orchestration software code 140/240/340, executed by hardware processor 104/354 of computing platform 102/352, and using product activation module 242.

The predetermined distance for triggering activation of dynamic product display unit 120/420 may be different for retail products 470 and motorized retail products 130/430. For example, dynamic product display unit 120/420 may be activated for attracting attention to retail products 470 only when one or more of retail products 470 are stocked on dynamic product display unit 120/420, i.e., one or more of retail products 470 are physically situated on dynamic product display unit 120/420. However, in some implementations, even when retail products 470 are completely absent from dynamic product display unit 120/420, dynamic product display unit 120/420 may be activated for attracting attention to motorized retail products 130/430 if one or more of motorized retail products 130/430 is within a predetermined linear distance of dynamic product display unit 120/420.

Venue orchestration software code 140/240/340 may utilize effects coordination module 242 in conjunction with product locator module 244 and product activation module 248 to activate dynamic product display unit 120/420 concurrently with presentation of the multi-media entertainment in action 586. For example, effects coordination module 242 may send product effects data 245 commanding activation of dynamic product display unit 120/420 to product activation module 248. Product activation module 248 may then provide display activation signal 220 as an output to dynamic product display unit or units 120/420 based on product location data 247 provided by product locator module 244.

As a specific, non-limiting, example of a Star Wars® themed multi-media entertainment including activation of dynamic product display unit 120/420 provided for conceptual clarity, retail products 470 may be non-motorized "passive" products, incapable of autonomous movement, and including one or more Darth Vader® doll, and a number of StormTrooper® dolls. A Darth Vader® doll is situated on dynamic product display unit 120/420 in the form of a platform that can tilt the doll forward or backward and twist from side to side.

According to this exemplary implementation, an in-store multi-media entertainment may start with lighting system 114/414, controlled by venue orchestration software code 140/240/340, causing the general lighting in the local retail sales area being dimmed, and a spotlight on the Darth Vader® doll being lighted or brightened. Audio system 118/418, controlled by venue orchestration software code 140/240/340, broadcasts the voice of Darth Vader® commanding "StormTroopers, ATTENTION!!" As the Darth Vader® doll continues to simulate speech, dynamic product display unit 120/420 can tilt the doll forward and backward, causing the Darth Vader® doll to appear to rock forward and back as it speaks.

Lighting system 114/414 may then cause the spotlight on the Darth Vader® doll to dim somewhat, while concurrently illuminating the StormTrooper® dolls. As the lights come up on the StormTrooper® dolls, which may initially be in a reclined sales display position on another of dynamic product display units 120/420, the StormTrooper® dolls may be tilted upward by dynamic product display units 120/420 so as to appear to be standing upright. Audio system 118/418 may then broadcast the sound of a chorus of StormTroopers® shouting "YES SIR!!" in response to the Darth Vader® doll's apparent command.

Lighting system 114/414 may then cause the spotlight on the Darth Vader® doll to brighten as audio system 118/418 broadcasts the voice of Darth Vader® commanding: "MARCH!!!" The dynamic product display unit 120/420 on which the StormTrooper® dolls are situated can then be caused to tilt those dolls forward and backward to simulate their marching. It is emphasized that the foregoing is merely an example of possibly much more complex interactions that can appear to go on between nominally passive retail products 470, effectively making them appear to come to life, due to activation of dynamic product display unit 120/420 by venue orchestration software code 140/240/340.

In addition to activating dynamic product display unit or units 120/420, in some implementations, venue orchestration software code 140/240/340, executed by hardware processor 104/354 of computing platform 102/352, may activate motorized retail products 130/430 to move concurrently with presentation of the multi-media entertainment in action 586. For example, effects coordination module 242 may send product effects data 245 commanding activation of motorized retail products 130/430 to product activation module 248. Product activation module 248 may then provide product activation signal 230 as a wireless output to one or more of motorized retail products 130/430 based on product location data 247 provided by product locator module 244.

In some implementations, venue orchestration software code 140/240/340, executed by hardware processor 104/354 of computing platform 102/352, may activate at least one of haptic actuators 116/416 to produce a haptic effect within retail venue 110/410. Moreover, in some implementations, such a haptic effect may be produced during presentation of the multi-media entertainment of action 586.

For example, venue orchestration software code 140/240/340 may receive haptic sensor data 128/228 from haptic sensors 116/416, and may identify one or more of haptic actuators 116/416 for activation based on haptic sensor data 128/228. That is to say, effects coordination module 242 may send haptic effects data 243 commanding the generation of haptic effects to haptics control module 246. Haptics control module 246 may then provide haptic activation signal 216 as an output to one or more of haptic actuators 116/416 based on haptic sensor data 128/228 provided by haptic sensors 126/426.

As noted above, in some implementations, haptic actuators 116/416 may be implemented in one or more of floor 462 and walls 464a and 464b of retail venue 110/410. As further noted above, in some implementations, the haptic effect produced using haptic actuators 116/416 may be experienced by customer 132/432 of retail venue seated 110/410 seated on seating structure 466 of retail venue 110/410, which may be a bench or a chair, for example.

As a specific example, haptic sensor data 128/228 received from haptic sensors 126/426 during presentation of the multi-media entertainment in action 586 may register pressure being applied to seating surface 468a and/or seating surface 468b of seating structure 466, indicating that customer 132/432 is seated on seating structure 466 during the multi-media entertainment. As a result, haptic activation signal 216 may cause haptic actuators 116/416 situated under seating structure 466 to cause seating structure 466 to move, such as to vibrate, rock, or otherwise undergo one or more temporary displacements.

Consequently, customer 132/432 can advantageously be further entertained by experiencing a haptic effect during presentation of the multi-media entertainment. Moreover, in some implementations, the haptic effect experienced by customer 132/432 may be modulated so as to be substantially synchronized with the multi-media entertainment presented using display screen 112/412, lighting system 114/414 and audio system 118/418 so as to render the entertainment an even more immersive experience within retail venue 110/410.

As a specific example of use of seating structure 466 in combination with haptic actuators 116/416, display screen 112/412, and audio system 118/418, in one implementation, seating structure 466 may be a bench situated so as to face display screen 112/412. Customer 132/432 of retail venue 110/410 may be seated on the bench.

Video camera 472 can be used to observe seated customer 132/432 from a viewpoint close to display screen 112/412. The customer 132/432 on the bench may then be shown a large-scale video "mirror view" of themselves (as though looking into a mirror) on display screen 112/412. The video coming from video camera 472 can have a new "cartoon" character added to it by computing platform 102.

In one implementation, computing platform 102 can determine where the image of customer 132/432 is on display screen 112/412, so that the cartoon character can appear to walk in front of customer 132/432 and obscure him or her, or to appear to walk behind customer 132/432 and be obscured in the reflection. Customer 132/432 will perceive the cartoon character as inhabiting retail venue 110/410 with customer 132/432, because customer 132/432 sees the cartoon character in the "mirror" produced using display screen 112/412 along with their own reflection.

Furthermore, for example, in one implementation, the cartoon character in the mirror may appear to sit next to customer 132/432 on the bench. If the cartoon character then appears to rap on or knock on the bench space between the image of customer 132/432 and itself, one or more of haptic actuators 116/416 in or under the bench can produce a real thump on the bottom of the bench where the cartoon character appeared to hit it. That haptic effect may be accompanied by an audible thumping or knocking sound, produced by audio system 118/418, thereby surprising customer 132/432 and leading customer 132/432 to believe that although he or she cannot see the cartoon character, nevertheless it is real, and occupying the physical world of retail venue 110/410 with customer 132/432.

Thus, the present application discloses commercial solutions providing a shopping experience that includes features that cannot be readily replicated in an online environment. The retail venues disclosed in the present application provide immersive and interactive customer experiences that blend shopping with entertainment. As a result, the present application advantageously discloses brick-and-mortar retail venues providing interactive experiences sufficiently attractive to motivate potential shoppers to do their browsing and purchasing in-store.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A method for use by a computer platform in a venue including a chair or a bench situated to face a display screen in the venue, the method comprising:
   obtaining a first video of a customer seated on the chair or the bench;
   playing a second video on the display screen, using the first video for creating a mirror of the customer, the second video showing:
      the customer seated on the chair or the bench;
      a character situated by the customer;
      the character performing an act in the second video; and
   activating one or more haptic actuators in the chair or the bench to produce a haptic effect corresponding to the act performed by the character in the second video.

2. The method of claim 1, wherein the character is a cartoon character.

3. The method of claim 1, wherein the character appears to walk in front of the customer and obscures the customer or to walk behind the customer and be obscured by the customer.

4. The method of claim 1, further comprising:
playing an audio corresponding to the act performed by the character in the second video.

5. The method of claim 4, wherein the act performed by the character is a thump, and the audio is a thumping sound.

6. The method of claim 4, wherein the act performed by the character is a knock, and the audio is a knocking sound.

7. A computing platform for use in a venue including a chair or a bench situated to face a display screen in the venue, the computing platform comprising:
a hardware processor; and
a memory storing a venue orchestration software code;
the hardware processor configured to execute the venue orchestration software code to:
obtain a first video of a customer seated on the chair or the bench;
play a second video on the display screen, using the first video for creating a mirror of the customer, the second video showing:
the customer seated on the chair or the bench;
a character situated by the customer;
the character performing an act in the second video; and
activate one or more haptic actuators in the chair or the bench to produce a haptic effect corresponding to the act performed by the character in the second video.

8. The computing platform of claim 7, wherein the character is a cartoon character.

9. The computing platform of claim 7, wherein the character appears to walk in front of the customer and obscures the customer or to walk behind the customer and be obscured by the customer.

10. The computing platform of claim 7, wherein the hardware processor is further configured to execute the venue orchestration software code to:
play an audio corresponding to the act performed by the character in the second video.

11. The computing platform of claim 10, wherein the act performed by the character is a thump, and the audio is a thumping sound.

12. The computing platform of claim 10, wherein the act performed by the character is a knock, and the audio is a knocking sound.

* * * * *